United States Patent
Pitzer

(10) Patent No.: US 6,619,129 B2
(45) Date of Patent: Sep. 16, 2003

(54) THREE-PIECE PRESSURE SENSOR WITH HIGH PRESSURE STAINLESS STEEL SENSING ELEMENT

(75) Inventor: Paul J. Pitzer, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/075,986

(22) Filed: Feb. 15, 2002

(65) Prior Publication Data
US 2003/0154795 A1 Aug. 21, 2003

(51) Int. Cl.[7] ................................. G01L 7/08
(52) U.S. Cl. ..................... 73/715; 73/700; 73/756
(58) Field of Search ..................... 73/715, 717, 720, 73/726, 756, 727, 721, 700, 706

(56) References Cited

U.S. PATENT DOCUMENTS

| 5,939,637 A | * 8/1999 | Pitzer et al. ............. 73/715 |
| 6,050,147 A | * 4/2000 | Viduya et al. ............ 73/700 |
| 6,312,061 B1 | * 11/2001 | Schliebe et al. ............ 303/20 |
| 6,351,996 B1 | * 3/2002 | Nasiri et al. ............ 73/706 |

* cited by examiner

Primary Examiner—Edward Lefkowitz
Assistant Examiner—Alandra Ellington
(74) Attorney, Agent, or Firm—Jimmy L. Funke; Stefan V. Chmielewski

(57) ABSTRACT

A three-piece pressure sensor assembly includes a one-piece pressure port formed of cold rolled steel, a stainless steel sensor element having an elongated annular side-wall, and an O-ring. The pressure port has a threaded slug at one end for attaching the sensor assembly to the wall of a pressure vessel and an annular cup at the other end. The annular cup has side-walls defining a cavity, and an annular axial recess formed in the center of the cavity receives the O-ring and a lower portion of the sensor element side-wall. A central post of the pressure port supports the inner periphery of the sensor element side-wall, and a portion of the pressure port material surrounding the recess is displaced radially inward against the sensor element side-wall, staking the sensor element in the cavity and compressing the O-ring between the sensor element and the bottom of the axial recess. An axial opening through the central post of the pressure port places the sensor element in communication with the interior of a pressure vessel to which the assembly is attached.

6 Claims, 1 Drawing Sheet

THREE-PIECE PRESSURE SENSOR WITH HIGH PRESSURE STAINLESS STEEL SENSING ELEMENT

TECHNICAL FIELD

This invention relates to a high pressure sensor for an automotive system, and more particularly to a low cost three-piece sensor assembly having a stainless steel pressure sensor element.

BACKGROUND OF THE INVENTION

Motor vehicle controls frequently require measurement of certain pressure parameters such as engine oil pressure, fuel pressure, transmission fluid pressure or brake pressure. For this reason, it is customary to attach high pressure sensors to various pressure vessels in the vehicle. High pressure applications generally utilize a stainless steel pressure sensor element welded to a pressure port that is attached to the pressure vessel by a threaded fitting, for example. To enable reliable welding of the sensor element to the pressure port, the pressure port must also be formed of stainless steel material.

Due to the high cost of stainless steel relative to other materials, and the difficulty of machining stainless steel, various pressure port configurations have been developed for minimizing the required amount of stainless steel. For example, the U.S. Pat. No. 5,939,637 to Pitzer et al., issued on Aug. 17, 1999 and assigned to the assignee of the present invention, discloses a three-piece pressure port comprising a casing formed of cold-rolled steel, a small stainless steel insert staked into a recess on one end of the casing, and an O-ring sandwiched between the casing and the insert to form a seal. In another configuration disclosed in the U.S. Pat. No. 6,050,147 to Viduya et al., issued on Apr. 18, 2000 and assigned to the assignee of the present invention, the casing is formed of stainless steel, and a hexagonal ring formed of cold-rolled steel is coupled to the outer periphery of the casing to enable installation and removal of the sensor assembly. In each case, the sensor element is welded to the stainless steel component of the pressure port, and an axial bore places the sensor element in communication with the interior of the pressure vessel to which the casing is attached.

While the above-mentioned configurations reduce the cost of the pressure port by minimizing the usage of stainless steel, a significant portion of the overall sensor cost is attributable to the welding of the sensor element to the pressure port. Accordingly, the cost of the sensor could be reduced even further if the welding operation could be eliminated.

SUMMARY OF THE INVENTION

The present invention provides an improved three-piece pressure sensor assembly including a one-piece pressure port formed of cold rolled steel, a stainless steel sensor element having an elongated annular side-wall, and an O-ring. The pressure port has a threaded slug at one end for attaching the sensor assembly to the wall of a pressure vessel and an annular cup at the other end. The annular cup has side-walls defining a cavity, and an annular axial recess formed in the center of the cavity receives the O-ring and a lower portion of the sensor element side-wall. A central post of the pressure port supports the inner periphery of the sensor element side-wall, and a portion of the pressure port material surrounding the recess is displaced radially inward against the sensor element side-wall, staking the sensor element in the cavity and compressing the O-ring between the sensor element and the bottom of the axial recess. An axial opening through the central post of the pressure port places the sensor element in communication with the interior of a pressure vessel to which the assembly is attached.

DESCRIPTION OF THE PREFERRED EMBODIMENT

Figure 1:
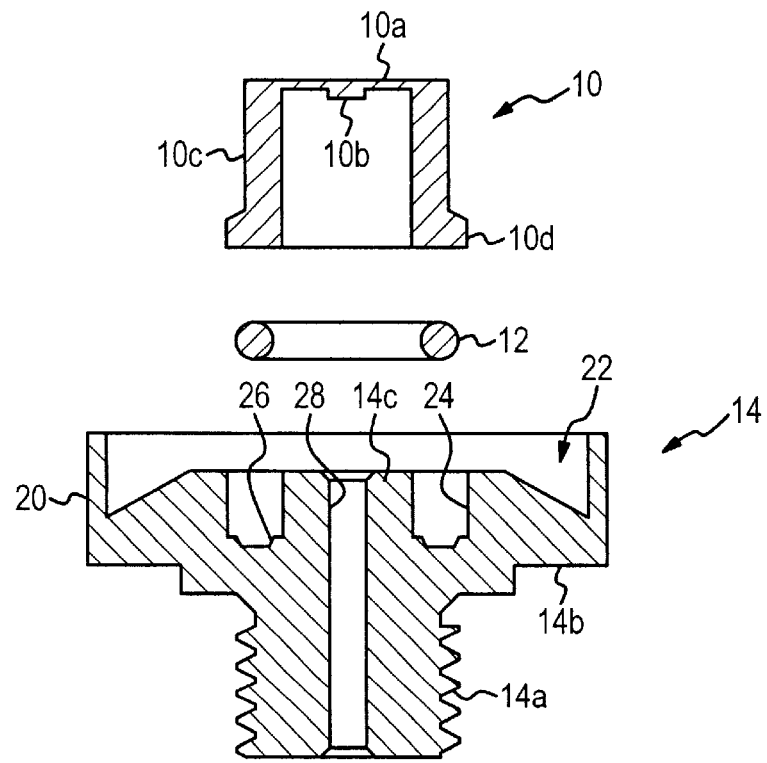
FIG. 1 is an exploded cross-sectional view of the three-piece pressure sensor of this invention.

Referring to the drawings, and particularly to FIG. 1, it will be seen that the pressure sensor of this invention comprises three components: a stainless steel sensor element 10, an O-ring 12, and a pressure port 14. The components 10, 12 and 14 are depicted as an assembled pressure sensor 16 in FIG. 2.

The stainless steel sensor element 10 is in the form of a top-hat having thin cylindrical upper diaphragm 10a with a central mass 10b, and an elongated and relatively thick annular side-wall 10c depending from the rim of the diaphragm 10a. A shoulder or flange 10d is formed at the base of the side-wall 10c to facilitate attachment of the sensor element 10 to the pressure port 14 as explained below. Stress sensitive elements are formed on the exposed surface of diaphragm 10a between the central mass 10b and the side-wall 10c, and connected in a bridge arrangement to detect stress due to a pressure difference across the diaphragm 10a. Typically, these elements are coupled (by wire bonding, for example) to an integrated circuit chip (not shown) which may be mounted on the outer surface of diaphragm 10a opposite central mass 10b. The integrated circuit detects and amplifies resistance variations due to the sensed pressure, and provides an electrical signal output indicative of the sensed pressure.

Figure 2:
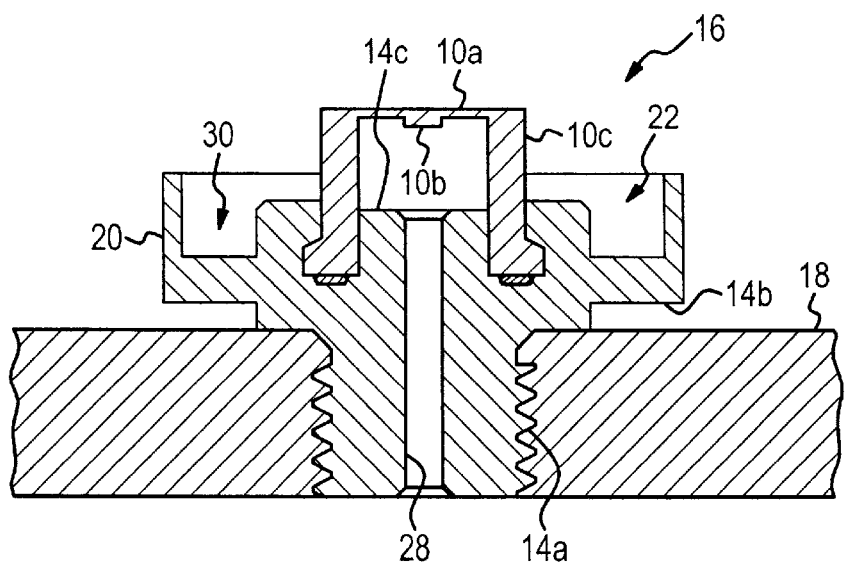
FIG. 2 is a cross-sectional view of a fully assembled pressure sensor according to this invention.

The pressure port 14 is formed of inexpensive cold-rolled steel, and has a threaded stud portion 14a at one end for attachment to the wall 18 of a pressure vessel as depicted in FIG. 2. An annular cup portion 14b at other end of pressure port 14 has a hex-shaped outer periphery 20 adapted to be engaged by a tool (not shown) when the sensor assembly 16 is installed in or removed from the pressure vessel wall 18. Additionally, the cup portion 14b includes a generally cylindrical cavity 22, and an annular recess 24 is formed in the bottom of the cavity 22 for receiving the O-ring 12 and a lower portion of the sensor element side-wall 10c and the flange 10d. The O-ring 12 is received in a secondary recess 26 formed in the bottom of the recess 24, while the shoulder 10d of sensor element 10 is seated on the bottom of the recess 24. Finally, a central axial bore 28 is formed in a central post or boss portion 14c of pressure port 14 inside the recess 24.

During assembly, the O-ring 12 is placed in the secondary recess 26, and the sensor element 10 is fitted on the pressure port 14 so that the flange 10d and a portion of the side-wall 10c extend into the annular recess 24. The sensor element 10 is then pressed downward into the pressure port to compress the O-ring 12 in the secondary recess 26, and a portion of the pressure port material surrounding the recess 24 is displaced radially inward by a staking operation to retain the sensor element 10 in the pressure port 14 as shown in FIG. 2. As also shown in FIG. 2, the inside diameter of the sensor element side-wall 10c is approximately equal to the inside diameter of recess 24 so that the boss portion 14c of pressure port 14 is in contact with the inner periphery of the annular side-wall 10c, and provides radial support for the side-wall 10c during the staking operation. As a result of the staking operation, a peripheral annular groove 30 is formed in the cavity 22, and a plastic terminal assembly (not shown) may be seated in the groove 30, and retained by a crimping operation if desired. After the assembly 16 is attached to the pressure vessel wall 18, the central axial bore 28 couples the inboard side of the diaphragm 10a to the medium contained by wall 18, and the compressed O-ring 12 seals the medium from the rest of cavity 22.

In summary, the pressure sensor assembly of the present invention contributes to reduced cost by eliminating welding of a stainless steel pressure sensor element to a stainless steel portion of the pressure port. This may be particularly significant in applications where the integrity of such a weld is subject to fatigue-related degradation. While the invention has been described in reference to the illustrated embodiment, it is expected that various modifications in addition to those mentioned above will occur to those skilled in the art. Accordingly, it will be understood that sensor assemblies incorporating such modifications may fall within the scope of this invention, which is defined by the appended claims.

What is claimed is:

1. A pressure sensor assembly comprising:
   a one-piece pressure port having a threaded slug portion at a first axial end for attachment of said sensor assembly to a pressure vessel and a cup portion at a second axial end, the cup portion having a central cavity, a central annular recess formed in a bottom surface of such cavity, and a central axial bore extending through said slug portion and a boss portion inside said annular recess;
   an O-ring disposed in said central annular recess; and
   a stainless steel pressure sensor element secured to said pressure port, the sensor element having a diaphragm portion and an annular side-wall depending from a rim of said diaphragm portion, said annular side-wall being disposed in part within said central annular recess so as to compress the O-ring between said annular side-wall and a bottom surface of said central annular recess.

2. The pressure sensor assembly of claim 1, wherein the pressure sensor element is secured to said pressure port by a portion of said pressure port surrounding said annular recess that is deformed radially inward against the annular side-wall of said pressure sensor element.

3. The pressure sensor assembly of claim 2, wherein the boss portion of said pressure port extends inside the annular side-wall of said pressure sensor element in contact with an inner periphery of said annular side-wall to radially support said annular side-wall during the radially inward deformation of said portion of said pressure port surrounding said annular recess.

4. The pressure sensor assembly of claim 1, wherein said O-ring is disposed in a secondary annular recess formed in the bottom surface of the central annular recess, and the annular side-wall of said pressure sensor element is seated on the bottom surface of said central annular recess.

5. The pressure sensor assembly of claim 1, including a flange formed at a base of said annular side-wall of said pressure sensor element that is seated on the bottom surface of said central annular recess such that said annular side-wall extends out of said central annular recess toward said diaphragm portion, and the pressure sensor element is secured to said pressure port by a portion of said pressure port surrounding said annular recess that is deformed radially inward against said annular side-wall.

6. The pressure sensor assembly of claim 5, wherein the boss portion of said pressure port extends inside the annular side-wall of said pressure sensor element in contact with an inner periphery thereof to radially support said annular side-wall during the radially inward deformation of said portion of said pressure port surrounding said annular recess.

* * * * *